United States Patent
Gopalakrishnan (10) Patent No.: US 10,241,567 B2
(45) Date of Patent: Mar. 26, 2019

(54) SYSTEM AND METHOD FOR DYNAMICALLY ADAPTING A VIRTUAL ENVIRONMENT

(71) Applicant: Wipro Limited, Bangalore (IN)

(72) Inventor: Subramonian Gopalakrishnan, Ernakulam (IN)

(73) Assignee: WIPRO LIMITED, Bangalore (IN)

( * ) Notice: Subject to any disclaimer, the term of this patent is extended or adjusted under 35 U.S.C. 154(b) by 36 days.

(21) Appl. No.: 15/461,168

(22) Filed: Mar. 16, 2017

(65) Prior Publication Data

US 2018/0217661 A1 Aug. 2, 2018

(30) Foreign Application Priority Data

Feb. 1, 2017 (IN) .............................. 201741003779

(51) Int. Cl.
| | |
|---|---|
| G06F 3/01 | (2006.01) |
| G06T 19/20 | (2011.01) |
| G06T 19/00 | (2011.01) |
| G06Q 30/06 | (2012.01) |

(52) U.S. Cl.
CPC .............. *G06F 3/011* (2013.01); *G06F 3/014* (2013.01); *G06F 3/015* (2013.01); *G06F 3/016* (2013.01); *G06Q 30/0643* (2013.01); *G06T 19/003* (2013.01); *G06T 19/20* (2013.01)

(58) Field of Classification Search
None
See application file for complete search history.

(56) References Cited

U.S. PATENT DOCUMENTS 6,792,304 B1 * 9/2004 Silberstein ......... A61B 5/04842
600/300
8,392,250 B2 3/2013 Pradeep et al.
(Continued)

OTHER PUBLICATIONS

Robert Sanders, "Sprinkling of neural dust opens door to electroceuticals", Aug. 3, 2016, *Mind &Body, Research, Technology & Engineering*, 6 pages.
(Continued)

*Primary Examiner* — Nicholas J Lee
(74) *Attorney, Agent, or Firm* — Finnegan, Henderson, Farabow, Garrett & Dunner, LLP (57) ABSTRACT

This disclosure relates generally to virtual reality and more particular to a system and method for dynamically adapting a virtual environment.
In one embodiment, a system for dynamically adapting a virtual environment, is disclosed, comprising a processor and a memory communicatively coupled to the processor. The memory stores processor instructions, which, on execution, causes the processor to receive at least one of user profile data and physical-response data associated with a user interacting with the virtual environment. The processor further provides haptic feedback to the user based on a pre-determined haptic stimulus pattern. The processor further receives neuro-response data associated with the user from at least one of a plurality of neural dust sensors in accordance with the pre-determined haptic stimulus pattern. The processor further dynamically adapts the virtual environment based on the neuro-response data and at least one of the physical-response data and the user profile data.

20 Claims, 4 Drawing Sheets

(56) References Cited

U.S. PATENT DOCUMENTS

| | | | |
|---|---|---|---|
| 2008/0027345 A1* | 1/2008 | Kumada | A61B 5/0478 600/383 |
| 2008/0043013 A1 | 2/2008 | Gruttadauria et al. | |
| 2009/0271294 A1 | 10/2009 | Hadi | |
| 2010/0185514 A1 | 7/2010 | Glazer et al. | |
| 2013/0317950 A1 | 11/2013 | Abraham et al. | |
| 2014/0365333 A1 | 12/2014 | Hurewitz | |
| 2016/0077547 A1 | 3/2016 | Aimone et al. | |
| 2017/0202518 A1* | 7/2017 | Furman | A61B 5/7264 |

OTHER PUBLICATIONS http://futuristicnews.com/teslasuit-vr-suit-with-haptic-feedback/, "Teslasuit: VR suit with haptic feedback", 2017, *Futuristic News*, 3 pages.

Inrak Choi et al., "Woiverine: A wearable haptic interface for grasping in virtual reality", *IROS* 2016, 8 pages.

\* cited by examiner

FIG. 4: Example Computer System

US 10,241,567 B2

SYSTEM AND METHOD FOR DYNAMICALLY ADAPTING A VIRTUAL ENVIRONMENT

PRIORITY CLAIM

This U.S. patent application claims priority under 35 U.S.C. § 119 to: Indian Application No. 201741003779, filed Feb. 1, 2017. The aforementioned applications are incorporated herein by reference in their entirety.

TECHNICAL FIELD

This disclosure relates generally to virtual reality and more particularly to a system and method for dynamically adapting a virtual environment.

BACKGROUND

Virtual reality (VR) technology has been explored from a research perspective since late 1950s. However, it may be recent advancement in display technology that has made the VR technology a reality to consumers. The VR technology may have initially been prevalent mostly in gaming industry and entertainment industry. However, in recent times, the VR technology has also been used for supporting virtual reality shopping. Ebay and Alibaba have already created virtual reality stores.

However, presently available virtual reality stores lack ability to capture implicit insights of the consumers. The presently available virtual reality stores also lack an intelligent assistant that can navigate the consumers through the virtual reality stores and give suggestions to the consumers based on the implicit insights and explicit insights. Consumers who may have physical disabilities, for instance, might not always be able to project their interest in a product in an explicit manner. The explicit insights captured by the presently available virtual reality stores may be inaccurate due to circumstances such as eye ball scanning in case of blind or dermal sensing in highly humid climatic conditions.

There are some attempted solutions that have tried to capture the implicit insights of the consumers. However, the attempted solutions have lesser accuracy and are essentially wired technology that makes it a less viable solution specially to disabled consumers.

SUMMARY

In an embodiment, the present disclosure illustrates a method of dynamically adapting a virtual environment. The method comprising receiving at least one of user profile data and physical-response data associated with a user interacting with the virtual environment. The method further comprising providing haptic feedback to the user based on a haptic stimulus pattern, wherein the haptic stimulus pattern is determined from one or more virtual objects that the user is interacting within the virtual environment and the user profile data. The method further comprising receiving neuro-response data associated with the user from at least one of a plurality of neural dust sensors in accordance with the haptic stimulus pattern. The method further comprising dynamically adapting the virtual environment based on the neuro-response data and at least one of the physical-response data and the user profile data.

In another embodiment, the present disclosure illustrates a system for dynamically adapting a virtual environment. The system comprises a processor and a memory communicatively coupled to the processor. The memory stores processor instructions, which, on execution, causes the processor to receive at least one of user profile data and physical-response data associated with a user interacting with the virtual environment. The processor further provides haptic feedback to the user based on a haptic stimulus pattern, wherein the haptic stimulus pattern is determined from one or more virtual objects that the user is interacting within the virtual environment and the user profile data. The processor further receives neuro-response data associated with the user from at least one of a plurality of neural dust sensors in accordance with the haptic stimulus pattern. The processor further dynamically adapts the virtual environment based on the neuro-response data and at least one of the physical-response data and the user profile data.

In yet another embodiment, a non-transitory computer readable storage medium is provided. The storage medium stores a program that, when executed by a computer, cause the computer to perform a method of dynamically adapting a virtual environment. The method comprises receiving at least one of user profile data and physical-response data associated with a user interacting with the virtual environment; providing haptic feedback to the user based on a haptic stimulus pattern, wherein the haptic stimulus pattern is determined from one or more virtual objects that the user is interacting within the virtual environment and the user profile data; receiving neuro-response data associated with the user from at least one of a plurality of neural dust sensors in accordance with the haptic stimulus pattern; and dynamically adapting the virtual environment based on the neuro-response data and at least one of the physical-response data and the user profile data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses a system and method for dynamically adapting a virtual environment. The system and method may be implemented in a variety of computing systems.

Working of the systems and methods for dynamically adapting a virtual environment is described in conjunction with FIG. 1-4. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

Figure 1:
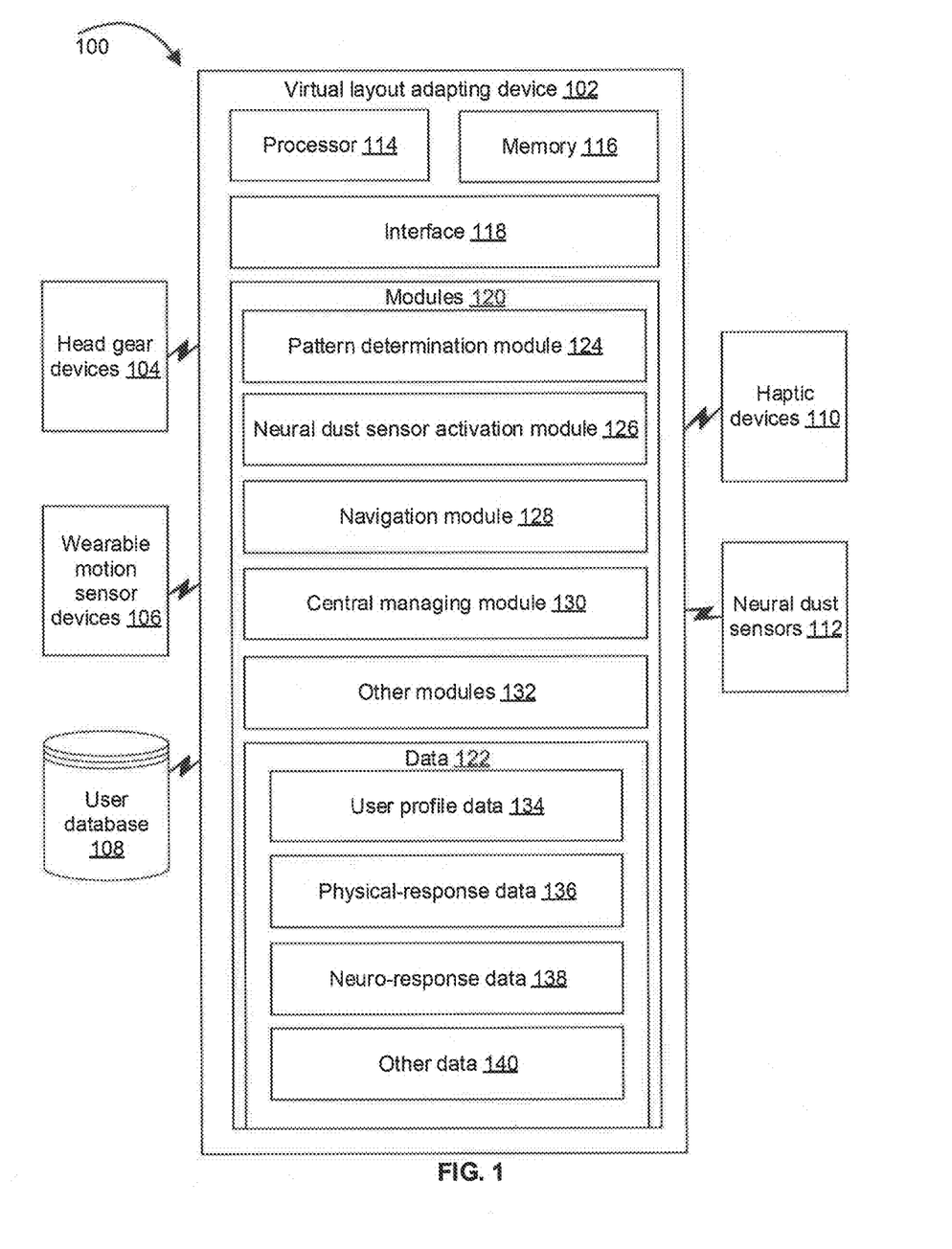
FIG. 1 illustrates an exemplary network implementation comprising a virtual layout adapting device for dynamically adapting a virtual environment, according to some embodiments of the present disclosure.

FIG. 1 illustrates an exemplary network environment 100 comprising a virtual layout adapting device 102, in accordance with some embodiments of the present disclosure. As shown in FIG. 1, the virtual layout adapting device 102 is communicatively coupled to head gear devices 104, wearable motion sensor devices 106, user database 108, haptic devices 110 and neural dust sensors 112. Although the head gear devices 104, the wearable motion sensor devices 106, the user database 108, the haptic devices 110 and the neural dust sensors 112 is shown external to the virtual layout adapting device 102 in FIG. 1, it may be noted that, in one implementation, the head gear devices 104, the wearable motion sensor devices 106, the user database 108, the haptic devices 110 and the neural dust sensors 112 may be present within the virtual layout adapting device 102.

The head gear devices 104 may comprise a 3D head mounted display, head motion tracking sensors, eye tracking sensors and an inertial measurement unit. The head motion tracking sensors may comprise gyroscopes, accelerometers and structured light systems. The wearable motion sensor devices 106 may comprise motion sensors and biosensors, wherein the motion sensors may comprise accelerometers and vibration sensors. In one embodiment, the wearable motion sensor devices 106 may be a wearable motion sensing suit. In one embodiment, the haptic devices 110 may be haptic gloves and haptic suits. The user database 108 may comprise user inputs, search history, social media data and sales transaction data. The neural dust sensors 112 may comprise motes and an external transceiver. Each mote may comprise a pair of electrodes, a transistor and a piezoelectric crystal.

The virtual layout adapting device 102 may be communicatively coupled to the head gear devices 104, the wearable motion sensor devices 106, the user database 108, the haptic devices 110 and the neural dust sensors 112 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in FIG. 1, the virtual layout adapting device 102 comprises a processor 114, a memory 116 coupled to the processor 114, and interface(s) 118. The processor 114 may be implemented as one or more microprocessors, microcomputers, microcontrollers, digital signal processors, central processing units, state machines, logic circuitries, and/or any devices that manipulate signals based on operational instructions. Among other capabilities, the processor 114 is configured to fetch and execute computer-readable instructions stored in the memory 116. The memory 116 can include any non-transitory computer-readable medium known in the art including, for example, volatile memory (e.g., RAM), and/or non-volatile memory (e.g., EPROM, flash memory, etc.).

The interface(s) 118 may include a variety of software and hardware interfaces, for example, a web interface, a graphical user interface, etc., allowing the virtual layout adapting device 102 to interact with user devices. Further, the interface(s) 118 may enable the virtual layout adapting device 102 respectively to communicate with other computing devices. The interface(s) 118 can facilitate multiple communications within a wide variety of networks and protocol types, including wired networks, for example LAN, cable, etc., and wireless networks such as WLAN, cellular, or satellite. The interface(s) 118 may include one or more ports for connecting a number of devices to each other or to another server.

In one example, the virtual layout adapting device 102 includes modules 120 and data 122. In one embodiment, the modules 120 and the data 122 may be stored within the memory 116. In one example, the modules 120, amongst other things, include routines, programs, objects, components, and data structures, which perform particular tasks or implement particular abstract datatypes.

In one implementation, the modules 120 include a Pattern determination module 124, a Neural dust sensor activation module 126, a navigation module 128 and a central managing module 130. In an example, the modules 120 may also comprise other modules 132. The other modules 132 may perform various miscellaneous functionalities of the virtual layout adapting device 102. It will be appreciated that such aforementioned modules may be represented as a single module or a combination of different modules.

In one example, the data 122 serves, among other things, as a repository for storing data fetched, processed, received and generated by one or more of the modules 120. In one implementation, the data 122 may include user profile data 134, physical-response data 136 and neuro-response data 138. In one embodiment, the data 122 may be stored in the memory 116 in the form of various data structures. In an example, the data 122 may also comprise other data 140 including temporary data and temporary files, generated by the modules 120 for performing the various functions of the virtual layout adapting device 102.

In order to dynamically adapt a virtual environment, the virtual layout adapting device 102 may receive at least one of user profile data and physical-response data associated with a user interacting with the virtual environment. The user profile data may comprise user inputs, search history, social media data and sales transaction data. The physical-response data may comprise a body movement pattern, an eye movement pattern, a head movement pattern, a facial expression and vital signs, wherein the vital signs may comprise body temperature, blood pressure, blood oxygen level and heart rate. The user profile data may be received from the user database 108. The user database 108 may be updated during run time based on the neuro-response data and the physical-response data. For instance, the user's disinterest in high heel foot wear may be inferred from the neuro-response data. This data may be used to update the user profile data. In another illustration, the user may put back a virtual object in the rack after viewing the high price in the price tag. Hence, the virtual layout adapting device 102 may infer that the user's focus is on making pocket-friendly purchases. This information may be used to update the user database 108. The physical-response data may be received from the head gear devices 104 and the wearable motion sensor devices 106. The user profile data may indicate user behavior, patterns and preferences.

The head gear devices 104 may comprise a 3D head mounted display, head motion tracking sensors, eye tracking sensors and an inertial measurement unit. The head motion tracking sensors may comprise gyroscopes, accelerometers and structured light systems. The wearable motion sensor devices 106 may comprise motion sensors and biosensors, wherein the motion sensors may comprise accelerometers and vibration sensors. In one embodiment, the wearable motion sensor device 106 may be a wearable motion sensing suit. The head gear devices 104 may be used to receive physical-response data and to display the virtual environment in 3D to the user.

After receiving at least one of the user profile data and the physical-response data, haptic feedback may be provided to the user based on a haptic stimulus pattern. The haptic stimulus pattern may comprise a pattern of providing haptic feedback at one or more locations on the body of the user. The haptic feedback may be provided by the haptic devices 110. In one embodiment, the haptic devices 110 may be haptic gloves and haptic suits. In one illustration, the haptic gloves may be used to create a sensation of grasping the virtual object. In the illustration, the sensation of grasping the virtual object may be created by resisting relative motion between fingers and thumb using a braking mechanism.

The haptic stimulus patter may be determined using a pattern determination module 124. In one embodiment, the pattern determination module 124 may compare size of one or more virtual objects with a size of the user interacting with the one or more virtual objects in the virtual environment, in order to determine the haptic stimulus pattern. The size of the user may be determined from the user profile data. In one illustration, the size of the user may be present in the sales transaction data of the user when the user has previously purchased a garment. In another illustration, the user himself may have to give the size of the user as a user input.

In one illustration, an avatar of an overweight user may be trying out a virtual slim fit T-shirt. In this illustration, the haptic stimulus pattern may be determined by comparing the size and the shape of the virtual slim fit T-shirt with the size and the shape of the overweight user. This will enable the haptic devices 110 to decide where exactly the haptic feedback needs to be provided to the overweight user. For instance, the virtual slim fit T-shirt may be tight around arms and waist of the overweight user.

In another illustration, an avatar of the user may try to weigh a virtual laptop. The haptic stimulus pattern may be determined by taking into consideration the size of the user and the size of the virtual laptop. For instance, for a small laptop the haptic stimulus pattern may be just one hand. However, for a big laptop the haptic stimulus pattern may be both hands. Also, a muscular user may need just one hand even if the laptop is heavy, in which case the haptic stimulus pattern may be just one hand. However, a weak user may need both hands to hold the same laptop, in which case the haptic stimulus pattern may be both the hands.

After providing haptic feedback to the user, neuro-response data may be received from at least one of a plurality of neural dust sensors 112 associated with the user. The neuro-response data may comprise extracellular electro-physiological data of muscles, nerves and organs. Examples for the extracellular electrophysiological data may be Electromyogram (EMG) data and Electroneurogram (ENG) data. In one embodiment, the neuro-response data may comprise at least one of voluntary movements and involuntary movements of peripheral nervous system. Illustrations for involuntary movements of the peripheral nervous system may be pinching, folding fist and facial muscle movements.

Plurality of neural dust sensors 112 may be introduced into the body of the user by using non-surgical approaches. At least one of the plurality of neural dust sensors 112 may be selectively activated by the neural dust sensor activation module 126 based on the haptic stimulus pattern. The neuro-response data corresponding to only the neural dust sensors 112 that are selectively activated, may be received by the virtual layout adapting device 102. The neuro-response data may be indicative of alertness, engagement, attention or resonance.

In one embodiment, there may be no requirement for the previous step of providing haptic feedback based on the haptic stimulus pattern. The neuro-response data may be received from the plurality of the neural dust sensors 112. Sensory pulses from electrical activity of neurons, may be located in the peripheral nervous system or in central nervous system. The sensory pulses may be transmitted through communication modes such as brain machine interface (BMI) or brain computer interface (BCI). The endpoints of BMIs may be nervous system and device. The end points of BCIs may be the brain and computer system. Neural dust sensors 112 act as mediators in this communication channel. In one illustration, the user may simply interact with a virtual assistant and simultaneously the neuro-response data may be gathered. The user's interest in the topic of discussion may be inferred from the neuro-response data.

Each of the neural dust sensors 112 may comprise motes and an external transceiver. Motes are micrometer scale wireless devices that may be implanted on to individual nerves and muscles. Motes may be inserted inside the body and the external transceiver may be placed on skin of the user. The external transceiver may generate ultrasound waves which activates the motes of the neural dust sensors 112. In one illustration, the motes of the neural dust sensors 112 may be powered up by a 540 nanosecond ultra sound pulses, which may be generated every 100 microseconds. The motes may comprise a pair of electrodes, a transistor and a piezoelectric crystal. Function of the pair of electrodes may be to record neural activity of the user. The neural activity of the user may be recorded by recording the potential difference between a first electrode placed in-tissue near the neural activity and a second electrode placed away from the neural activity. The second electrode may act as a global ground electrode. Function of the transistor may be to amplify the potential difference between the first electrode and the second electrode. Function of the piezoelectric crystal may be to convert mechanical power of the ultrasound waves to electrical power. Another function of the piezoelectric crystal may be to communicate the recorded neural activity. The external transceiver may also receive the ultrasound waves reflected from the motes. A user with a particular disability may find the neural dust sensors 112 an attractive option since they are less obstructive to the user, due to the absence of wires in the neural dust sensors 112.

After receiving the neuro-response data the virtual environment may be dynamically adapted based on the neuro-response data and at least one of the physical-response data and the user profile data, by the central managing module 130. In order to dynamically adapt the virtual environment, the neuro-response data, the physical-response data and the user profile data may be analyzed first. In one embodiment, each of the neuro-response data, the physical-response data and the user profile data may give contexts to each other. In one illustration, a user may be looking at a foot wear and then instinctively keeping it back after seeing that the foot wear is a high heel foot wear. The neuro-response data may reveal the neural activity that leads to the reflexive action of keeping the foot wear back in the rack. The transaction history in the user profile data may also reveal that the user generally prefers flat foot wear. In this illustration, the neuro-response data may be considered in the context of the user profile data. In another illustration, the user profile data may reveal that the user prefers pocket-friendly purchases. In this illustration, the user may keep the high heel foot wear back in the rack, because the foot wear is beyond the user's budget and not because the user prefers flat foot wear. In this illustration, the neuro-response data may be understood using the context set by the user profile data.

Dynamically adapting the virtual environment may also comprise dynamically adapting layout of the virtual environment and dynamically adapting ambience of the virtual environment based on the neuro-response data, the physical-response data and the user profile data. In one embodiment, initial layout of the virtual environment may be based on the user profile data. After that, the layout of the virtual environment may be dynamically adapted based on the neuro-response data, the physical-response data and the user profile data. In an illustration, analyzing the user profile data and the neuro-response data may give an impression that the user may not be interested in the high heel foot wear. Accordingly, the layout of the virtual environment may be altered so that the rack may be equipped with flat foot wear. The rack that the user is viewing, presently, may not be altered, unless there is a significant difference between what the user wants and what the user is viewing.

Dynamically adapting the virtual environment may also comprise dynamically adapting the ambience of the virtual environment based on the neuro-response data, the physical-response data and the user profile data. In one embodiment, the user may be given several choices of ambience in the virtual environment and the user may give affirmation via a physical response to the user's choice of ambience. In one illustration, the user may nod to select the choice of ambience. For instance, the choice of the ambience may be a wedding reception. The user may be able to visualize the user's avatar in the selected garment in the ambience of the wedding reception.

In addition to dynamically adapting the virtual environment, the navigation module 128 may also simulate navigation of the user along the virtual environment based on the physical-response data and the neuro-response data. In one illustration, eyeball of the user may be focused in a particular direction and the user may be navigated to that particular direction. The direction of the focus of the eyeball may be available in the physical-response data. In one illustration, the navigation module 128 may simulate the experience of walking to the particular direction. In one embodiment, the user may choose assistance of a virtual assistant. In this scenario, navigation of the user may be done using the voice of the virtual assistant. For instance, the virtual assistant may be speaking about certain types of toys and that may have caught the rapt attention of the user. This may be inferred from the neuro-response data of the user. In this illustration, the virtual assistant may with the permission of the user, navigate the user to the toy section. In another embodiment, the user may self-navigate through the virtual environment. In this illustration, a wheel chair panel may be provided to the user and navigation may occur via the touch of the user.

Figure 2:
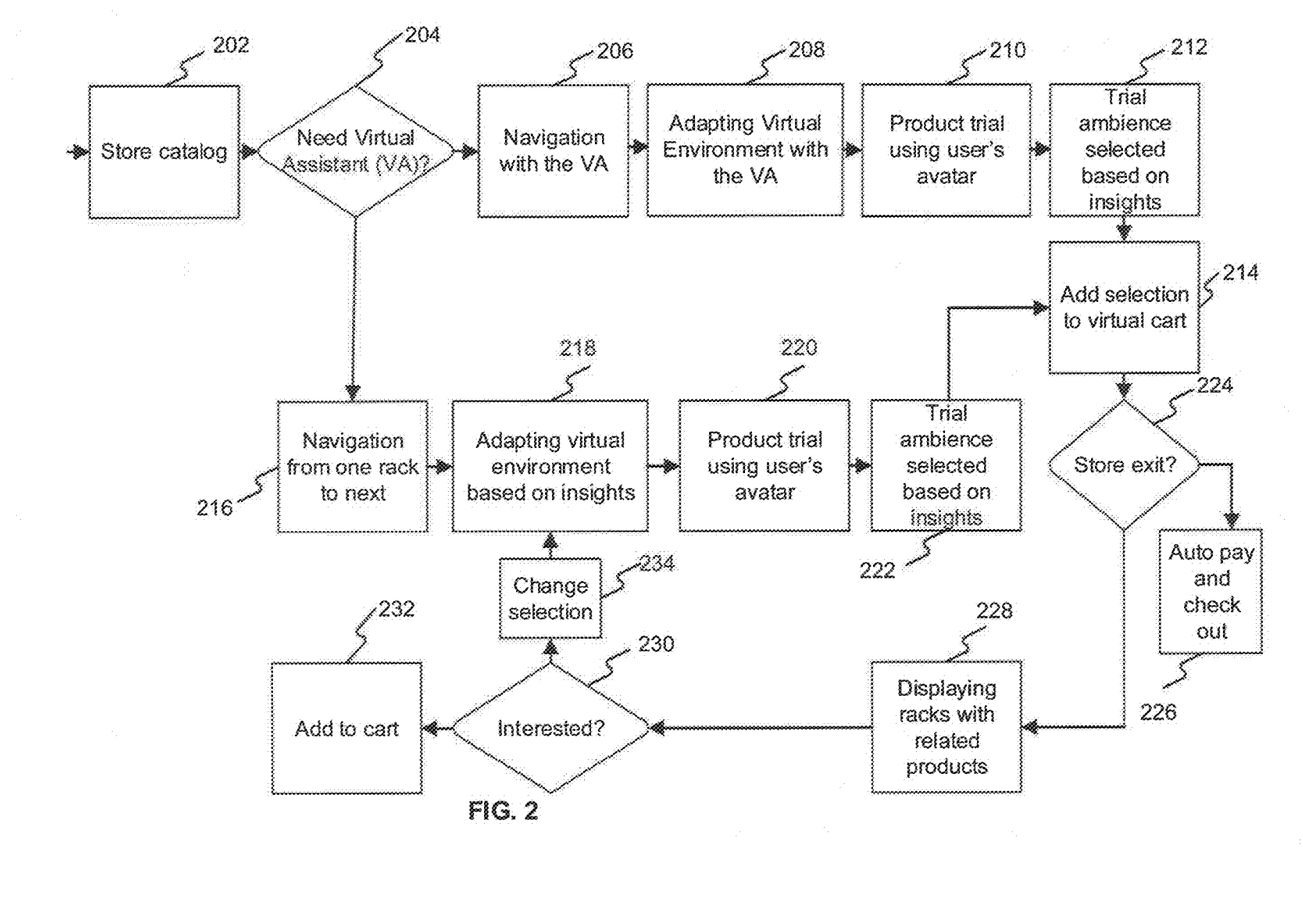
FIG. 2 is a functional block diagram of a virtual environment, where the virtual environment is dynamically adapted in accordance with some embodiments of the present disclosure.

FIG. 2 shows a functional block diagram of a virtual environment, where the virtual environment is dynamically adapted. In one embodiment, the user may encounter a virtual lift in the virtual environment. Upon entering the virtual lift, the user may be provided with a list of store catalogs, at step 202. The user may choose the store catalog of the user's choice. After choosing the store catalog, the user may need to decide whether a virtual assistant is required or not, at step 204. The interaction of the virtual assistant with the user may be based on the user profile data, the neuro-response data and the physical-response data. For instance, the virtual assistant may gather from the neuro-response data that the user is disinterested in interacting with the virtual assistant in inner wear section. Hence, the virtual assistant may stay quiet until a question is directed at the virtual assistant.

When the user prefers employing a virtual assistant, then the user may be navigated along the virtual environment with the assistance of the virtual assistant, at step 206. The virtual environment may be adapted based on the user profile data, the physical-response data and the neuro-response data with the additional input from the virtual assistant, at step 208. The virtual assistant may interact with the user in order to collect valuable information about the user. In one illustration, the user may inform the virtual assistant that the user intends to buy something for the user's brother, the next time the user comes for shopping. This may be valuable information, according to which the virtual environment may be adapted. In the meantime, preferences of the user's brother may be gathered using available information from the social media data and corroborated with the user inputs to enable the assistant to offer thoughtful suggestions drawn from cognitive insights.

While the user is navigating through the virtual environment, the user may select, with the assistance of the virtual assistant, a virtual object of the user's choice in order to try it out. The product trial may be done using user's avatar, at step 210. The trial ambience may be selected by the user or the trial ambience may be determined based on the user profile data, the physical-response data and the neuro-response data, at step 212. In one illustration, the trial ambience may be selected based on the user input. In one illustration, the trial ambience may be chosen based on a physical response such as nod of the user. In one illustration, the trial ambience may be decided based on level of interest expressed by the user when the virtual assistant was interacting with the user. For instance, when the virtual assistant was discussing about wedding reception, the user had shown great interest in the topic. A wedding reception may be the selected trial ambience in this illustration. Once the user decides to purchase the product, the product may be added to the virtual cart, at step 214.

If the user decides that the user does not need the virtual assistant, then the navigation from one rack to the next may be done without the assistance of the virtual assistant at step 216. The virtual environment may be adapted based on the user profile data, the physical-response data and the neuro-response data, without the inputs from the virtual assistant, at step 218. After selecting the virtual object for trial, the product trial may be done using user's avatar, at step 220. The trial ambience may be selected by the user or the trial ambience may be determined based on the user profile data, the physical-response data and the neuro-response data, at step 222. Once the user decides to purchase the product, the product may be added to the virtual cart, at step 214.

In one embodiment, the user may proceed without the virtual assistant and at some point of time the physical-response data and the neuro-response data may reveal that the user is confused. In this case, the virtual assistant may approach the user again, offering assistance. The assistance in this case could be anything from suggesting tips, preferences, suggestive choices to accompanying throughout the virtual environment.

The user may be given a choice to exit the store at step 224. If the user is ready to exit the store, then the user may return to the virtual lift. The user may choose the exit option that may be displayed in front of the user. There may be an auto payment and an auto check out mechanism, at step 226, that can be done using the physical-response data. For instance, a nod or a gesture such as thumbs up may translate to the auto payment and the auto check out. Receipt of the payment and the estimated time of delivery may be made available to the user via a message to the user's mobile phone. In one illustration, the auto payment may be done with the biometric or wearable ECG sensor authentication.

If the user does not select the exit option, the user may be provided with a display of products that may be related to selected product, at step 228. The user may be asked whether the user finds the related products interesting, at step 230. If the user finds any of the related products interesting the user may add the product to the cart, at step 232. If the user is not interested in the related products, he may select a different catalog, at step 234.

Figure 3:
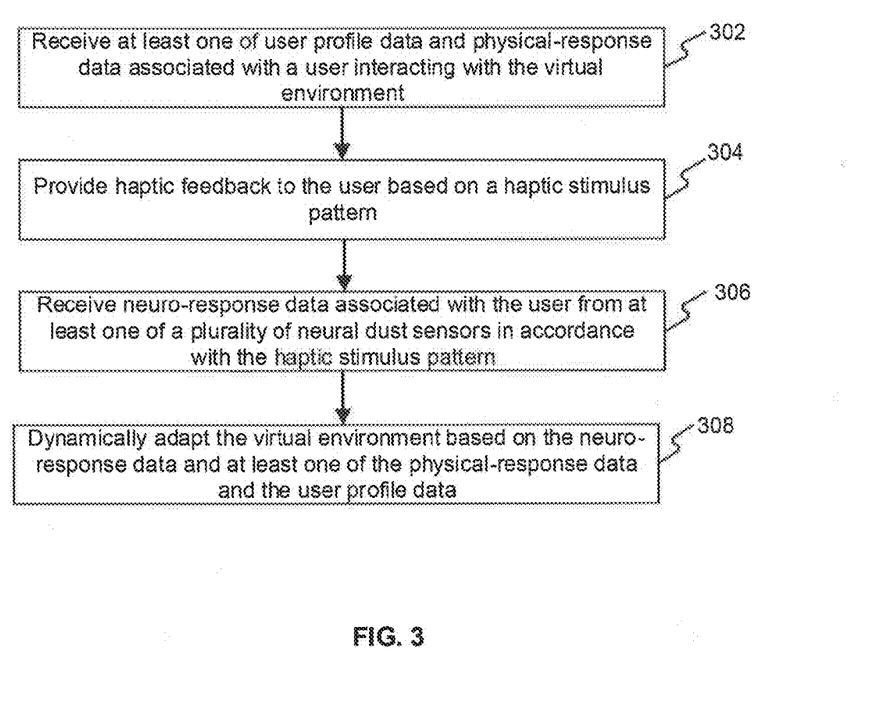
FIG. 3 is a flow diagram illustrating a method of dynamically adapting a virtual environment in accordance with some embodiments of the present disclosure.

FIG. 3 is a flow diagram illustrating a method of dynamically adapting a virtual environment. With reference to FIG. 3, at least one of user profile data and physical-response data associated with a user interacting with the virtual environment may be received, at step 302. The user profile data may comprise user inputs, search history, social media data and sales transaction data. The physical-response data may comprise a body movement pattern, an eye movement pattern, a head movement pattern, a facial expression and vital signs, wherein the vital signs comprise body temperature, blood pressure, blood oxygen level and heart rate. The user profile data may be received from the user database. The user database may be updated during run time based on the neuro-response data and the physical-response data. For instance, the user's disinterest in high heel foot wear may be inferred from the neuro-response data. This data may be used to update the user profile data. In another illustration, the user may put back a virtual object in the rack after viewing the high price in the price tag. Hence, the virtual layout adapting device 102 may infer that the user's focus is on making pocket-friendly purchases. This information may be used to update the user database. The physical-response data may be received from the head gear devices 104 and the wearable motion sensor devices 106.

The head gear devices 104 may comprise a 3D head mounted display, head motion tracking sensors, eye tracking sensors and an inertial measurement unit. The head motion tracking sensors may comprise gyroscopes, accelerometers and structured light systems. The wearable motion sensor devices 106 may comprise motion sensors and biosensors, wherein the motion sensors may comprise accelerometers and vibration sensors. In one embodiment, the wearable motion sensor device 106 may be a wearable motion sensing suit. The head gear devices 104 may be used to receive the physical-response data and to display the virtual environment in 3D to the user.

After receiving at least one of the user profile data and the physical-response data, haptic feedback may be provided to the user based on a haptic stimulus pattern, at step 304. The haptic stimulus pattern may comprise a pattern of providing the haptic feedback at one or more locations on the body of the user. The haptic feedback may be provided by the haptic devices 110. In one embodiment, the haptic devices 110 may be haptic gloves and haptic suits. In one illustration, the haptic gloves may be used to create a sensation of grasping the virtual object. In the illustration, the sensation of grasping the virtual object may be created by resisting relative motion between fingers and thumb using a braking mechanism. In one illustration, haptic suits may calibrate measurements of the virtual objects for users with visual disabilities. It may also serve as a response generating mechanism during product trial.

The haptic stimulus pattern may be determined using a pattern determination module 124. In one embodiment, the pattern determination module 124 may compare size of one or more virtual objects with a size of the user interacting with the one or more virtual objects in the virtual environment, in order to determine the haptic stimulus pattern. The size of the user may be determined from the user profile data. In one illustration, the size of the user may be present in the sales transaction data of the user when the user has previously purchased a garment. In another illustration, the user himself may have to give the size of the user as a user input.

After providing the haptic feedback to the user, neuro-response data may be received from at least one of a plurality of neural dust sensors 112 associated with the user at step 306. The neuro-response data may comprise extracellular electrophysiological data. Examples for the extracellular electrophysiological data may be Electromyogram (EMG) data and Electroneurogram (ENG) data. In one embodiment, the neuro-response data may comprise at least one of voluntary movements and involuntary movements of peripheral nervous system. Illustrations for involuntary movements of the peripheral nervous system may be pinching, folding fist and facial muscle movements.

The plurality of neural dust sensors 112 may be introduced into the body of the user by using non-surgical approaches. At least one of the plurality of neural dust sensors 112 may be selectively activated by the neural dust sensor activation module 126 as per the haptic stimulus pattern. The neuro-response data corresponding to only the neural dust-sensors 112 that are selectively activated, may be received by the virtual layout adapting device 102. The neuro-response data may be indicative of alertness, engagement, attention or resonance. In one illustration, if the haptic stimulus pattern indicates arms and waist, then the neuro-response data from the neural dust sensors, that are placed in the vicinity of the arms and the waist, may be received.

In one embodiment, the haptic feedback such as vibrations may trigger few of the plurality of the neural dust sensors 112, thus selectively activating the few of the plurality of the neural dust sensors 112.

In one embodiment, there may be no requirement for the previous step of providing haptic feedback based on the haptic stimulus pattern. The neuro-response data may be received from the plurality of the neural dust sensors 112. Sensory pulses from electrical activity of neurons, may be located in the peripheral nervous system or in central nervous system. The sensory pulses may be transmitted through communication modes such as brain machine interface (BMI) or brain computer interface (BCI). The endpoints of BMIs may be nervous system and device. The end points of BCIs may be the brain and computer system. Neural dust sensors 112 act as mediators in this communication channel. In one illustration, the user may simply interact with a virtual assistant and simultaneously the neuro-response data may be gathered. The user's interest in the topic of discussion may be inferred from the neuro-response data.

Each of the neural dust sensors 112 may comprise motes and an external transceiver. Motes are micrometer scale wireless devices that may be implanted on to individual nerves and muscles. Motes may be inserted inside the body and the external transceiver may be placed on skin of the user. The external transceiver may generate ultrasound waves which activates the motes of the neural dust sensors 112. In one illustration, the motes of the neural dust sensors 112 may be powered up by a 540 nanosecond ultra sound pulses, which may be generated every 100 microseconds. The motes may comprise a pair of electrodes, a transistor and a piezoelectric crystal. Function of the pair of electrodes may be to record neural activity of the user. The neural activity of the user may be recorded by recording the potential difference between a first electrode placed in-tissue near the neural activity and a second electrode placed away from the neural activity. The second electrode may act as a global ground electrode. Function of the transistor may be to amplify the potential difference between the first electrode and the second electrode. Function of the piezoelectric crystal may be to convert mechanical power of the ultrasound waves to electrical power. Another function of the piezoelectric crystal may be to communicate the recorded neural activity. The external transceiver may also receive the ultrasound waves that may be encoded with the neural activity of the user. A user with a particular disability may find the neural dust sensors 112 an attractive option since they are less obstructive to the user, due to the absence of wires in the neural dust sensors 112.

In one embodiment, the same external receiver may be used to receive signals from several motes. The external transceiver may be able to identify the particular mote from which the reflected ultrasound waves have been received.

In one illustration, the user may interact with the virtual assistant and inform him that he is pleased with a virtual shirt. However, by analyzing the neuro-response data the central managing module may conclude that the user is uncomfortable in the virtual shirt. The virtual assistant may politely inform the user that he looks uncomfortable in the virtual shirt and whether he would like to try out a different shirt.

After receiving the neuro-response data the virtual environment may be dynamically adapted based on the neuro-response data and at least one of the physical-response data and the user profile data, at step 308. In order to dynamically adapt the virtual environment, the neuro-response data, the physical-response data and the user profile data may be analyzed first. In one embodiment, each of the neuro-response data, the physical-response data and the user profile data may give contexts to each other. In one illustration, a user may be looking at a foot wear and then instinctively keeping it back after seeing that the foot wear is a high heel foot wear. The neuro-response data may reveal the neural activity that leads to the reflexive action of keeping the foot wear back in the rack. The transaction history in the user profile data may also reveal that the user generally prefers flat foot wear. In this illustration, the neuro-response data may be considered in the contexts of the user profile data. In another illustration, the user profile data may reveal that the user prefers pocket-friendly purchases. In this illustration, the user may keep the high heel foot wear back in the rack, because the foot wear is beyond the user's budget and not because the user prefers flat foot wear. In this illustration, the neuro-response data may be understood using the context set by the user profile data.

Computer System

Figure 4:
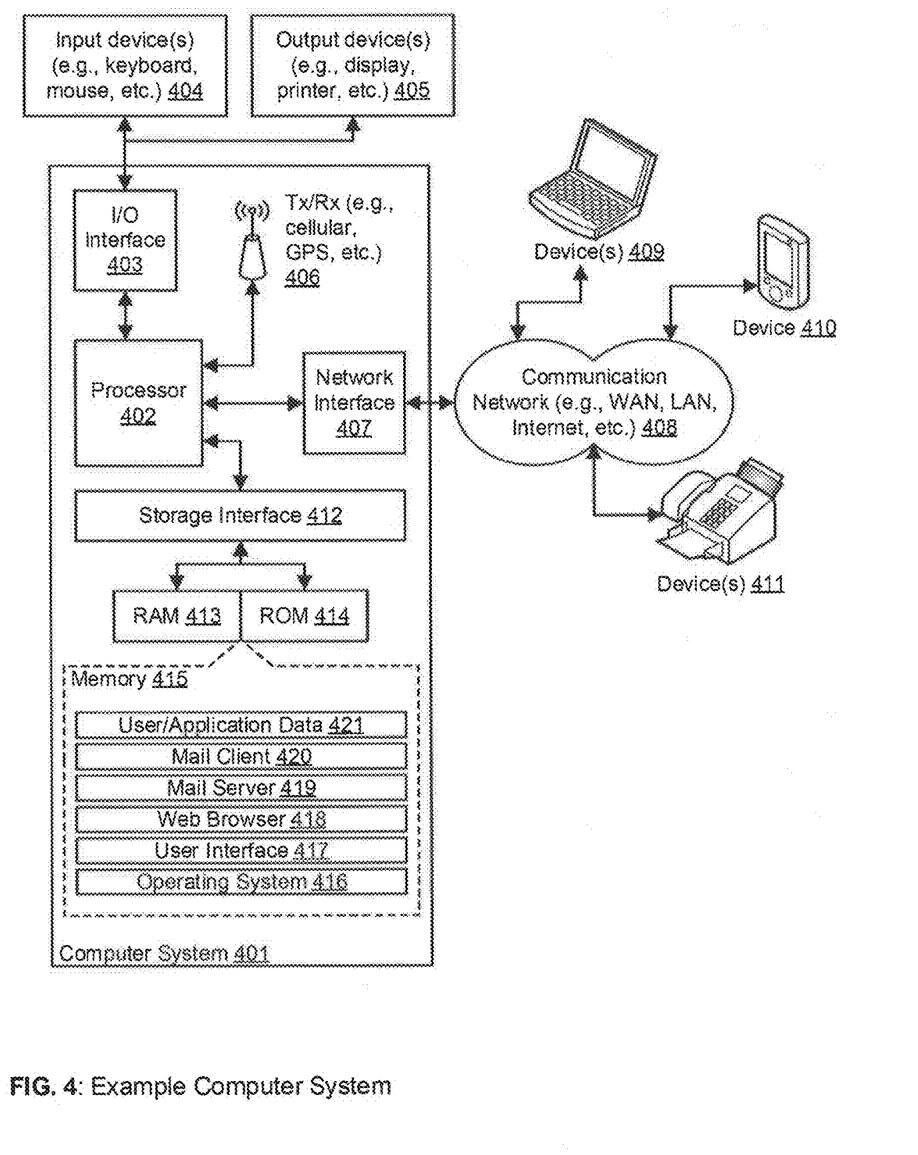
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the virtual layout adapting device. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11ab/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described application title. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of dynamically adapting a virtual environment, the method comprising:
   receiving, by a virtual layout adapting device, at least one of user profile data and physical-response data associated with a user interacting with the virtual environment;
   providing, by the virtual layout adapting device, haptic feedback to the user based on a haptic stimulus pattern, wherein the haptic stimulus pattern is determined from one or more virtual objects that the user is interacting with in the virtual environment and the user profile data;
   receiving, by the virtual layout adapting device, neuro-response data associated with the user from at least one of a plurality of neural dust sensors in accordance with the haptic stimulus pattern; and
   dynamically adapting, by the virtual layout adapting device, the virtual environment based on the neuro-response data and at least one of the physical-response data and the user profile data.

2. The method as claimed in claim 1, wherein the haptic stimulus pattern comprises a pattern of providing haptic feedback at one or more locations on the body of the user.

3. The method as claimed in claim 1, wherein receiving the neuro-response data comprising selectively activating at least one of the plurality of neural dust sensors based on the haptic stimulus pattern.

4. The method as claimed in claim 1, wherein the user profile data comprises at least one of user inputs, search history, social media data and sales transaction data.

5. The method as claimed in claim 1, wherein the physical-response data comprises at least one of a body movement pattern, an eye movement pattern, a head movement pattern, a facial expression or vital signs.

6. The method as claimed in claim 1, wherein the neuro-response data comprises extracellular electrophysiological data.

7. The method as claimed in claim 1, wherein dynamically adapting the virtual environment further comprising analyzing the neuro-response data and at least one of the physical-response data and the user profile data of the user to determine a new layout of the virtual environment.

8. The method as claimed in claim 1, wherein dynamically adapting the virtual environment comprising at least one of:
   dynamically adapting layout of the virtual environment based on the neuro-response data and at least one of the physical-response data and the user profile data; and
   dynamically adapting ambience of the virtual environment based on the neuro-response data and at least one of the physical-response data and the user profile data.

9. The method as claimed in claim 1, further comprising simulating navigation of the user along the virtual environment based on at least one of the physical-response data and the neuro-response data.

10. The method as claimed in claim 1, further comprising refining the user profile data based on the neuro-response data and the physical-response data.

11. A system for dynamically adapting a virtual environment, the system comprising:
   a processor;
   a memory communicatively coupled to the processor, wherein the memory stores the processor-executable instructions, which, on execution, causes the processor to:
   receive at least one of user profile data and physical-response data associated with a user interacting with the virtual environment;
   provide haptic feedback to the user based on a haptic stimulus pattern, wherein the haptic stimulus pattern is determined from one or more virtual objects that the user is interacting with in the virtual environment and the user profile data;
   receive neuro-response data associated with the user from at least one of a plurality of neural dust sensors in accordance with the haptic stimulus pattern;
   and dynamically adapt the virtual environment based on the neuro-response data and at least one of the physical-response data and the user profile data.

12. The system as claimed in claim 11, wherein the haptic stimulus pattern comprises a pattern of providing haptic feedback at one or more locations on the body of the user.

13. The system as claimed in claim 11, wherein the processor is further configured to receive the neuro-response data by selectively activating at least one of the plurality of neural dust sensors based on the haptic stimulus pattern.

14. The system as claimed in claim 11, wherein the user profile data comprises at least one of user inputs, search history, social media data and sales transaction data.

15. The system as claimed in claim 11, wherein the physical-response data comprises at least one of a body movement pattern, an eye movement pattern, a head movement pattern, a facial expression or vital signs.

16. The system as claimed in claim 11, wherein the neuro-response data comprises at least one of voluntary movements and involuntary movements of peripheral nervous system.

17. The system as claimed in claim 11, wherein the processor is configured to dynamically adapt the virtual environment by analyzing the neuro-response data and at least one of the physical-response data and the user profile data of the user to determine a new layout of the virtual environment.

18. The system as claimed in claim 11, wherein dynamically adapting the virtual environment comprising at least one of:
   dynamically adapting layout of the virtual environment based on the neuro-response data and at least one of the physical-response data and the user profile data; and
   dynamically adapting ambience of the virtual environment based on the neuro-response data and at least one of the physical-response data and the user profile data.

19. The system as claimed in claim 11, wherein the processor is further configured to simulate navigation of the user along the virtual environment based on at least one of the physical-response data and the neuro-response data.

20. A non-transitory computer readable storage medium storing a program that, when executed by a computer, cause the computer to perform a method of dynamically adapting a virtual environment, the method comprising:

receiving at least one of user profile data and physical-response data associated with a user interacting with the virtual environment;

providing haptic feedback to the user based on a haptic stimulus pattern, wherein the haptic stimulus pattern is determined from one or more virtual objects that the user is interacting with in the virtual environment and the user profile data;

receiving neuro-response data associated with the user from at least one of a plurality of neural dust sensors in accordance with the haptic stimulus pattern; and dynamically adapting the virtual environment based on the neuro-response data and at least one of the physical-response data and the user profile data.

\* \* \* \* \*